(12) United States Patent
Malik

(10) Patent No.: US 6,463,130 B1
(45) Date of Patent: Oct. 8, 2002

(54) METHOD AND SYSTEM FOR CREATING AUTOMATED VOICE RESPONSE MENUS FOR TELECOMMUNICATIONS SERVICES

(75) Inventor: Dale W. Malik, Atlanta, GA (US)

(73) Assignee: Bellsouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/127,413

(22) Filed: Jul. 31, 1998

(51) Int. Cl.[7] .............................................. H04M 3/42
(52) U.S. Cl. ................................ 379/88.22; 379/211.02
(58) Field of Search ........................... 379/67.1, 88.11, 379/88.22, 201.01, 201.02, 201.03, 201.12, 207.11, 211.01, 211.02, 212.01, 213.01

(56) References Cited

U.S. PATENT DOCUMENTS

| | | | | |
|---|---|---|---|---|
| 4,922,520 A | * | 5/1990 | Bernard et al. | 379/88 |
| 5,222,125 A | * | 6/1993 | Creswell et al. | 379/67.1 |
| 5,430,719 A | | 7/1995 | Weisser, Jr. | |
| 5,488,650 A | * | 1/1996 | Greco et al. | 379/67 |
| 5,737,393 A | * | 4/1998 | Wolf | 379/67 |
| 5,771,276 A | * | 6/1998 | Wolf | 379/88 |
| 5,825,856 A | * | 10/1998 | Porter et al. | 379/93.12 |
| 6,072,867 A | * | 6/2000 | Lieuwen | 379/220 |
| 6,122,345 A | * | 9/2000 | Johnson | 379/67.1 |
| 6,125,126 A | * | 9/2000 | Hallenstal | 379/211 |
| 6,324,265 B1 | * | 11/2001 | Christie, IV et al. | 379/88.23 |
| 6,324,273 B1 | * | 11/2001 | Alcott | 379/201 |

* cited by examiner

Primary Examiner—Scott L. Weaver
(74) Attorney, Agent, or Firm—Kilpatrick Stockton LLP

(57) ABSTRACT

A method and system for creating automated voice response menus for telecommunications services includes the creation of a task for the menu. The menu includes a group of pre-recorded messages assembled in manner to complete the task. The menu retrieves certain required inputs and certain optional inputs from a subscriber of the telecommunications service. The menu does not permit the user to provide other inputs or to select other menus. Instead, the menu uses straight-line processing to direct the user towards task completion. Once the task is complete, the user is immediately exited from the system.

14 Claims, 11 Drawing Sheets

METHOD AND SYSTEM FOR CREATING AUTOMATED VOICE RESPONSE MENUS FOR TELECOMMUNICATIONS SERVICES

BACKGROUND OF THE INVENTION

1. Field of the Invention

The present invention is directed to wireless and PSTN telecommunications service menus and, more particularly, to a method and system for directing a user through a menu of options for an advanced telecommunications service.

2. Background

Wireless and PSTN telephone companies (including local exchange carriers ("LECs")) often offer subscribers a wide variety of advanced telecommunications services. Among the services offered are call forwarding, flexible call forwarding. call waiting, follow-me services, caller identification, and voicemail. Certain services (for example, call waiting) are enabled by the subscriber using standard touch-tone features. Specifically, the subscriber simply enters a feature access code (e.g., "*72") to enable the service for his calling line. For instance, call forwarding on a home line is often enabled by dialing the feature access code and waiting for a double-burst dial tone from the office switch. The subscriber then dials the directory number of a destination calling line to which the calls should be forwarded. This information is then retained by the network. All subsequent calls are automatically forwarded to the specified destination calling line. When the subscriber desires to turn off the service, he simply dials a second feature access code (e.g., "*73"), which disables the service. This on/off activation provides a clear and simple interface for the subscriber.

The on/off activation of services has several drawbacks, however. First, such activation often inhibits the remote enablement of features for a particular calling line. Feature access codes usually affect only the calling line from which they are dialed. For example, a subscriber to call forwarding usually cannot enable the service by dialing a feature access code from a line other than the line for which the service was provisioned. Thus, if the service were provisioned on his home line, he could not dial the feature access code from his parents' home to enable the service.

Second, simple on/off activation prevents the flexible use of a service. Many services, including most call forwarding and call waiting services, are extremely inflexible regarding the time and manner in which they are offered. Typically, once the code is dialed, the service is enabled until the subscriber dials a second feature access code to disable the service. The subscriber cannot specify the time for initiating and/or concluding the service. Moreover, the subscriber cannot further configure the service in any fashion to suit his needs.

Third, on/off activation prevents the LEC from offering usage-based billing. Usage-based billing allows a carrier to charge a subscriber for a service based upon the amount of use of that service by the subscriber. Billing usually occurs on a per-minute, per-hour, or per-day basis. With feature access code-enablement, the subscriber simply turns the service on and off. The carrier does not keep track of the subscriber's usage. If the subscriber uses the service infrequently, he cannot justify the overall monthly cost to rent the service. As a result, the carrier would lose a subscriber that it might otherwise have gained if usage-based billing were offered.

To prevent the aforementioned drawbacks, a wireless or PSTN carrier can provide an automated voice response ("AVR") menu billing system. An AVR menu system relies upon Advanced Intelligent Network ("AIN") functionality to provide the subscriber with more options and greater flexibility when enabling and configuring a service. These options are provided to the subscriber using pre-recorded messages. When the subscriber dials a special access number (as opposed to a two-digit access code), the subscriber listens to this menu of options. The subscriber may then use her touch-tone telephone (or her own voice) to select options as they are provided. In this manner, specific configurations may be established to provide greater flexibility to the user.

Most AVR menus are created to offer a "tree-like" format for the subscriber. The subscriber begins the menu at the "trunk" of the tree. As he selects specific menu items, he is guided down "branches" of the tree. Each "branch" may then have several "sub branches" that may be navigated by the subscriber. If the subscriber makes a mistake, he can usually press a button (e.g., "*") to return to the previous menu or "branch." The subscriber may repeatedly press this button until he is returned to the desired menu.

Very often, however, navigating complex tree menus can be a very daunting task. If the subscriber has progressed down several sub-branches, he eventually may forget his location within the menu. As a greater number of sub-branches (options) are provided at subsequent levels, this problem can grow exponentially. Ultimately, the subscriber may be forced to give up and re-dial the system. This situation wastes time and causes frustration among subscribers.

In addition, the subscriber may lose focus and forget his original task when dialing the number. For instance, a caller originally may desire to set a wake-up call. When she dials the system, the system may offer her several wake-up call options, guide her down several more layers of the menu, and then offer to take her back to the "main menu". If the subscriber makes a mistake while setting her wake-up call options, she will be taken back to the main menu where she will be re-offered several options again. If the subscriber has already been taken down numerous sub-menus, she may now be attracted by the offer to retrieve messages from her mailbox. Thus, the subscriber has been routed away from the original "task" of obtaining a wake-up call. This scenario, too, is wasteful and inefficient.

Finally, both consumers and telecommunications companies incur costs for using complex AVR menus. The length of time of an AVR telecommunications service call usually corresponds directly to the complexity of the AVR menu. Since consumers are charged for the length of telephone calls, the costs to the consumers for such calls are likely to increase with complexity. Similarly, service providers have costs associated with the provision of the telecommunications service. The goal of the service provider should be a fast and efficient method for providing telecommunications services through AVR menus.

SUMMARY OF THE INVENTION

The present invention overcomes many of the problems of the prior art by navigating a subscriber through a telecommunications service menu in a more direct and efficient manner than other systems. Specifically, the method and system of the present invention navigates the subscriber using a set of rules designed to facilitate the quick and methodical configuration of services. The telecommunications services menus provide a simple interface to the subscriber without the confusion normally associated with such menus.

The present invention is directed to a method and system for creating an automated voice response menu. These menus allow subscribers to configure a telecommunications service, such as call forwarding, voicemail, and caller identification. The subscriber accesses the menus by dialing a feature access code from his home calling line or by remotely dialing a special access number. The subscriber is then connected to a network element, such as a service circuit node, that stores several pre-recorded messages to be played for the subscriber. The messages are assembled into a menu based upon a "straight-line thinking" methodology that moves the user from a starting point to an ending point. The user is not permitted to veer from this path.

Each menu allows the subscriber to complete a task related to the configuration and/or use of a particular telecommunications service. Once the user has selected the task, he is only presented options for the completion of that task. Unlike other automated voice response menus, the user is not allowed to select options unrelated to the task. Moreover, the user is not allowed to select options returning the user to a previous menu. If the user has a mistake, the system will return the user back to the beginning of a particular task menu. The user is not allowed to make the decision to return to earlier options within the menu or to return to previous menus. This methodology allows the user to remain focused on a particular task and has the further advantage of expediting the telephone call.

Each menu includes a starting point and a completion point. The starting point is merely the entry point for the menu, such as a welcome message. The completion point represents the completion of the desired task. The menu further includes one or more required inputs. Each required input assists the system in completing the task. If a required input is not provided, the system will request the information again until a predetermined number of errors has been reached. The menu may further include one or more optional inputs. If the user does not provide an optional input, the system will merely complete the task and exit. If the user provides an optional input, the system may send the user to a second menu directed to a sub-task of the original task. The menu will not be directed to a second unrelated task.

In summary, the method and system of the present invention allows a user to quickly access an automated voice response system. In addition, the present invention reduces the confusion normally associated with such menus while improving efficiency and creating simplicity. The present invention also reduces costs to the user and the telecommunications service company by reducing the time spent by the user in navigating the menu. Advantageously, the present invention allows the user to plan for and complete a predetermined telecommunications services task without delay.

Accordingly, it is an object of the present invention to provide a method and system for creating an automated voice response menu that allows a user to quickly configure or use a telecommunications service.

It is an additional object of the present invention to provide a method and system for creating an automated voice response menu that reduces confusion for the user.

It is yet another object of the present invention to provide a method and system for creating an automated voice response menu that increases the user's efficiency.

It is a further object of the present invention to provide a method and system for creating an automated voice response menu that reduces costs for the user.

Finally, is an additional object of the present invention to provide a method and system for creating an automated voice response menu that reduces cost for the provider of a telecommunications service.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION

Reference will now be made in detail to a preferred embodiment of the invention, examples of which are illustrated in the accompanying drawings. Wherever possible, the same reference numbers will be used throughout the drawings to refer to the same or like parts.

Figure 1:
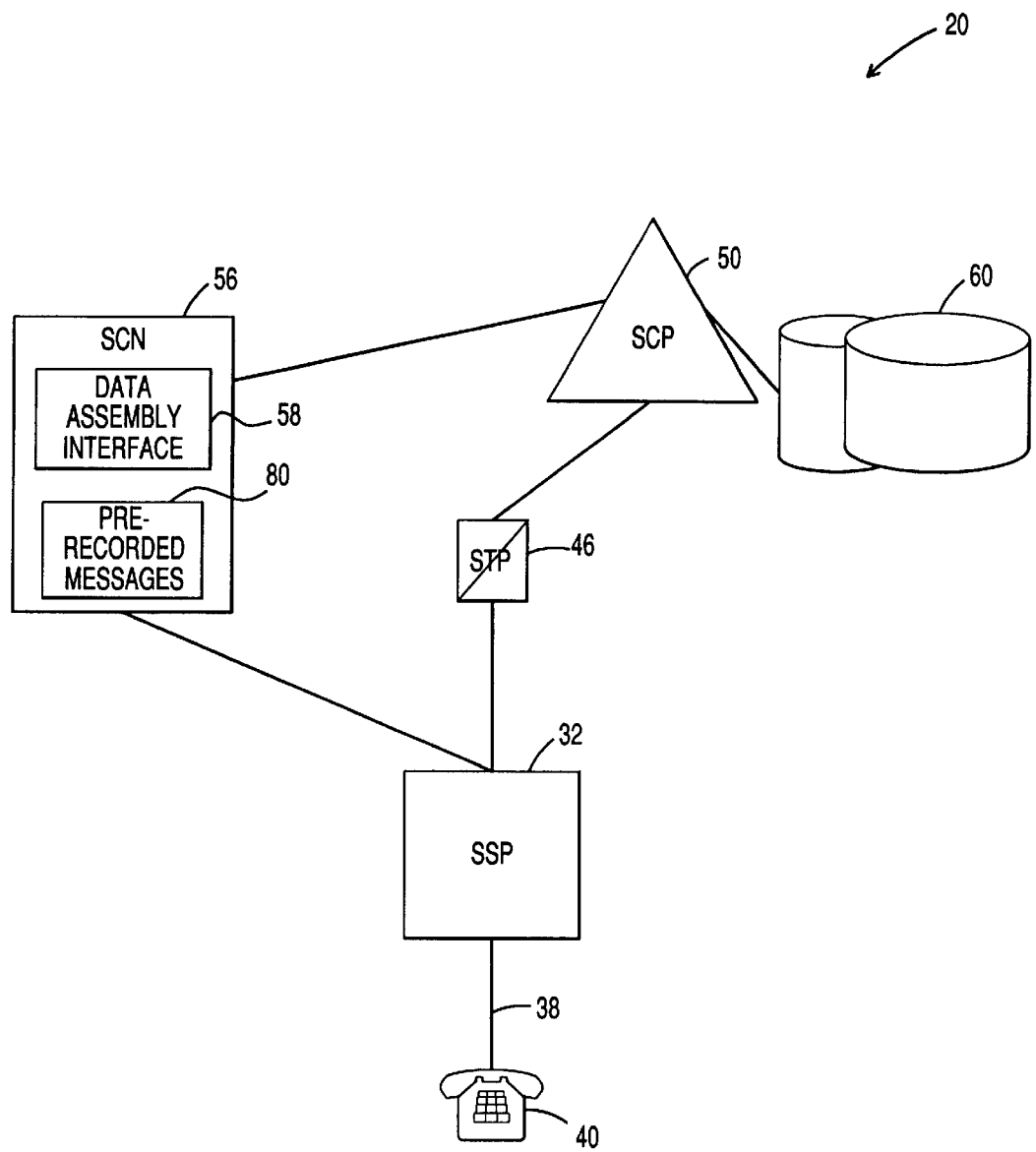
FIG. 1 is a block diagram of an exemplary telephone network for offering a temporary advanced telecommunication service, according to a preferred embodiment of the present invention.

FIG. 1 is a block diagram of an exemplary telephone network 20 for offering a temporary advanced telecommunication service ("advanced telecommunication service" or "advanced service"), according to a preferred embodiment of the present invention. The service offered may be, for example, a voice mail service, a call forwarding service, a follow-me service, billing verification, or any other advanced service. For exemplary purposes, the network 20 illustrated in FIG. 1 is designed for flexible call forwarding services, although it should be apparent to one of ordinary skill in the art that the method and system described herein may equally apply to other services, including those listed above. The network 20 is coupled to a public switched telephone network 40 and includes several Advanced Intelligent Network ("AIN") elements. For brevity, only a basic explanation of AIN is provided herein. Where the network 20 operates or is composed differently in an important aspect from that which would be understood by those skilled in the art, additional details are provided herein. For further information regarding AIN technology and aspects thereof, the interested reader is referred to U.S. Pat. No. 5,430,719, to Weisser, which is incorporated herein by reference.

The network 20 includes a variety of interconnected network elements. A group of such network elements includes an end office which is indicated as service switching points ("SSPs" or "switches") 32 in FIG. 1. An SSP typically includes switch functionality, but also includes other functionality so as to communicate with other AIN elements as those skilled in the art understand. As further illustrated in FIG. 1 the SSP 32 is coupled to a subscriber line 38. A subscriber line may also be referred to as a calling line. Each SSP 32 serves a designated group of calling lines, and thus, the SSP that serves a particular calling line may be referred to as its serving switch. Calling line 38 is connected typically to a piece of terminating equipment including a telephone 40. Although telephones are illustrated as the terminating equipment in FIG. 1, those skilled in the art will understand that such terminating equipment may include other telecommunication devices including, but not limited to, facsimile machines, computers, modems, etc. The terminating equipment includes a handset or keypad that allows a user to enter digits when prompted. End offices may further be coupled through a tandem office. The tandem office is used to connect and switch circuits between and among other end offices.

Each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

The SSP 32 is connected to another type of AIN element referred to as a local signal transfer point 46 via a data link. Currently, this is a data link employing a signaling protocol referred to as Signaling System #7 ("SS7"), which is well known to those skilled in the art. Much of the intelligence of the AIN resides in yet another type of AIN element referred to as a local service control point ("SCP") 50 that is connected to STP 46 over an SS7 data link. Among the functions performed by the SCP 50 is the maintenance of network databases and subscriber databases as represented collectively by databases 60. These databases may be used in providing the advanced telecommunications services described herein to a customer. The network 20 may include additional SCPs, including a backup SCP to be used when the primary SCP is out of service.

As illustrated in FIG. 1, the network 20 also includes a service circuit node ,56 ("SCN"). SCN 56 includes a processor, a memory, and voice and dual tone multi-frequency ("DTMF") signal recognition devices and voice synthesis devices. In addition, SCN 56 may include a data assembly interface 58 for use in connection with the present invention. SCN 56 is connected to the local SCP 50 via data link 57 using an X.25 protocol. In addition, SCN 56 typically is connected to one or more SSPs via Integrated Services Digital Network ("ISDN") links.

A subscriber initiates a request for advanced service by dialing, for example, a feature access code. For remote activation of the advanced service, the caller may dial an administrative directory number. To accommodate these requests for advanced services, a preferred embodiment of the present invention provides for the recognition of a "trigger" at the SSP that is used in connection with the exemplary embodiment. The SSP 32 is provisioned with a feature activation ("FAC") trigger. The FAC trigger causes the SSP to pause and launch a query to a coupled SCP 50. In addition, each of the calling lines that may be used to request billing services at a particular SSP are provisioned with a termination attempt trigger ("TAT") in an idle state. When an advanced service is to be applied to a calling line, the SCP 56 provides the appropriate SSP with an instruction to change the state of the TAT trigger for that calling line from the idle state to an active state. The effect of a TAT trigger on a calling line in the active state will be understood to those skilled in the art as causing a pause at the SSP serving the calling line in the processing of any communication received on or directed to the calling line number. The SSP pauses so as to query the SCP and receive a response with instructions as to further processing of the communication. In this manner, the SSP obtains the instructions for applying the advanced service to the communication. When the service is to be removed from the calling line, then the SCP provides the appropriate SSP with an instruction to change the state of the TAT trigger for that calling line from the active state to the idle state. In the idle state, the TAT trigger does not cause a pause in the processing of a communication received on or directed to the calling line number.

When the subscriber dials the feature access code or the administrative number for the advanced service, the FAC trigger at the SSP 32 is encountered. This causes the SSP 32 to pause processing and send a query to the SCP 50. The SCP 50 searches databases 60 for a subscription. If no subscription is found, the SCP routes the call to the SCN 56. The SCN presents an AVR menu to the user. The user activates the advanced service by selecting the appropriate option from the AVR menu. The SCN then sends an X.25 message to the SCP to create a temporary subscription. The SCP creates the subscription and sends a request for an update to the SSP 32. The SSP 32 activates the TAT trigger on the subscriber's calling line and returns a message to the SCP 50 indicating a successful result. The SCP 50 sends a confirmation to the SCN. A confirmation is then given to the subscriber.

Once the subscriber has established a subscription for the service, he may configure the service as he chooses. The interface for configuring the service includes a group of AVR menus containing options that the subscriber may choose. These AVR menus are stored and provided through the SCN 56. A group of pre-recorded messages 80 are stored by the SCN 56. These scripts 80 are retrieved by the SCN 56 and then assembled together by a data assembly interface 58 to create a desired menu for a subscriber. The creation of an AVR menu will now be described.

The AVR menus for each service are task-based. Thus, the goal of each menu is to assist the user in completing a desired task. The task may be a complex task, such as establishing and configuring a service. The task may also be a simple task, such as retrieving voice mail messages. In either event, the goal of the menu is to direct the user from the beginning of the menu to the completion of the task in the fastest and most efficient manner possible. The user is not permitted to stray from the task.

Figure 2:
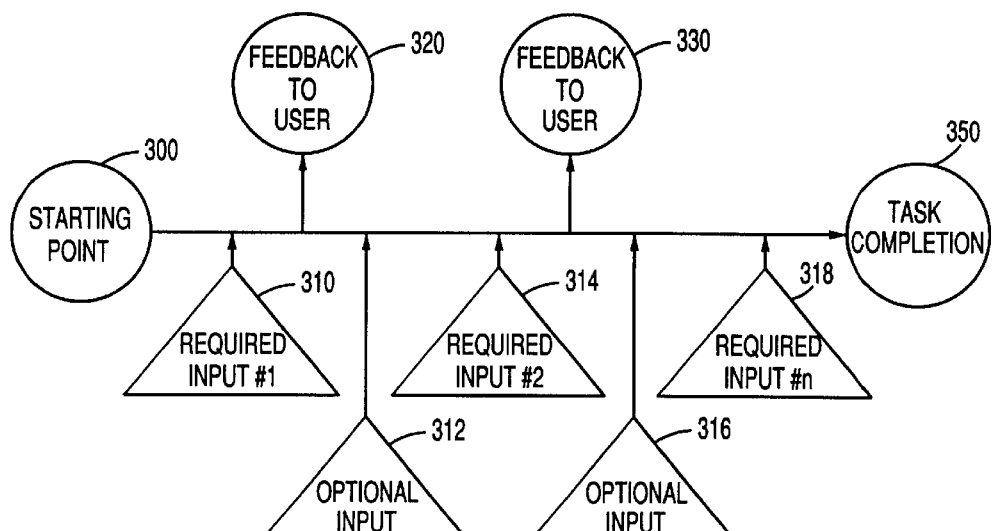
FIG. 2 is a task-oriented diagram of an AVR menu, according to a preferred embodiment of the present invention.

FIG. 2 illustrates the task-based scheme of AVR menu creation, according to a preferred embodiment of the present invention. As illustrated, each menu includes a starting point 300 and a completion point 350. The starting point represents the entry point of the subscriber into the menu. The finish point represents the desired task of the menu. To complete the desired task, the system of the present invention accepts n inputs 310–318 from the subscriber. The inputs 310–318 represent data from the user that assist the system in completing the task.

Certain inputs 310, 314, 318 are required inputs, while other inputs 312, 316, are optional inputs. Required inputs represent data necessary to complete the task. Optional inputs are data points from the user that may provide more personalized service to the user, but are not necessary in the completion of the task. Once data inputs 310–318 are provided, the system can complete the task.

The menu also provides feedback at feedback points 320, 330 to the user. In FIG. 2, feedback is provided to the user.

The feedback may occur at various points throughout the menu and includes instructions and information to assist the user in navigating the menu. For instance, the menu informs the user of errors and returns the user to an earlier point within the menu. In addition, the menu may read back information regarding services that have been configured by the user.

Menus are constructed according to a series of "straight-line thinking" rules. Once a task has been selected by the subscriber, the subscriber may not divert from the task during the course of a service call. In addition, the subscriber is only provided options available within the selected task (i.e., required and optional inputs). The subscriber is not provided options from other tasks. Nor is the subscriber allowed to select another task once a task has been chosen. If the user makes an error, the AVR menu may return the user to additional options within the task. The user, however, is not allowed to choose to return to an earlier option. When the lowest-order option within a task has been selected by the user, the menu exits. If additional sub-tasks of the primary task are requested (as optional inputs), the system will then present each additional input to the user as a separate sub-task for completion. If, however, the user does not desire to perform any additional sub-tasks, the system will exit the user from the menu. Preferably, at least 95% of the options selectable by the user within the task offer a binary decision to the user.

Figure 3:
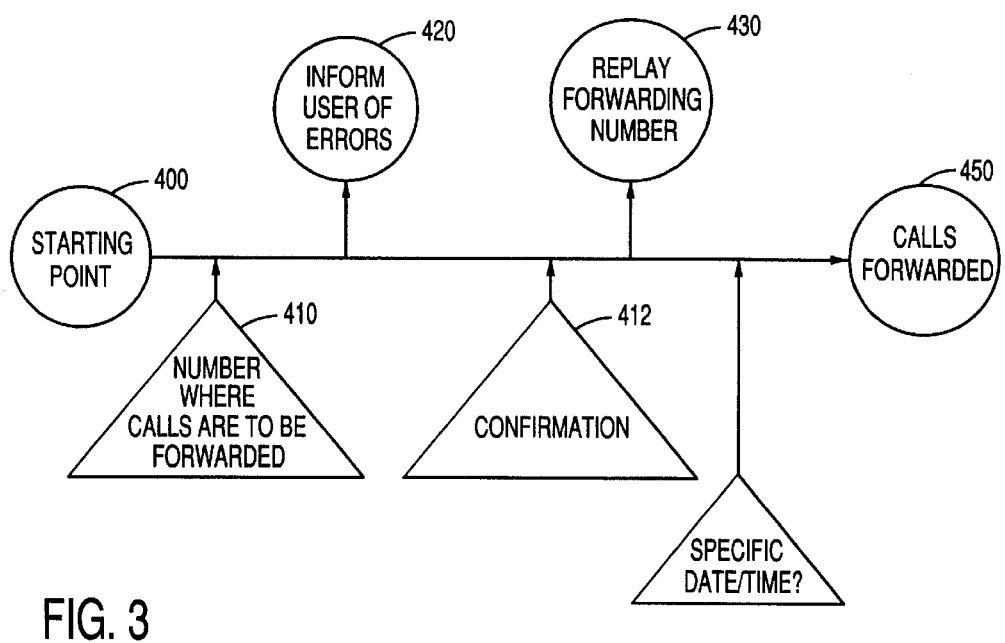
FIG. 3 is an example of a task-oriented diagram for a call forwarding AVR menu.

FIG. 3 is an example of a task-oriented diagram for a call forwarding AVR menu. As shown, the menu has a starting point 400. The starting point 400 will typically be an introduction to the system and/or a selection of services. Once the call forwarding service has been selected, the system accepts two required inputs 410, 412 from the user. Specifically, the system requests the number to which calls should be forwarded. In addition, the system requires a confirmation from the user. The system also requests an optional input 414 from the user. If the user would like to stop forwarding calls at a specific date and time, he may include this request as an optional input 414. The menu informs the user of errors at various points represented by a feedback point 420. When the user is nearing completion, the menu provides additional feedback 430 informing the user of his specified forwarding number. With the required inputs 410, 412 the system forwards the subscribers calls at the task completion point 450. It should be noted that the user is not permitted to provide additional inputs towards completing the task. In addition, the user is not permitted to branch off to a separate, unrelated task from the initially selected task of forwarding his calls.

Figure 4:
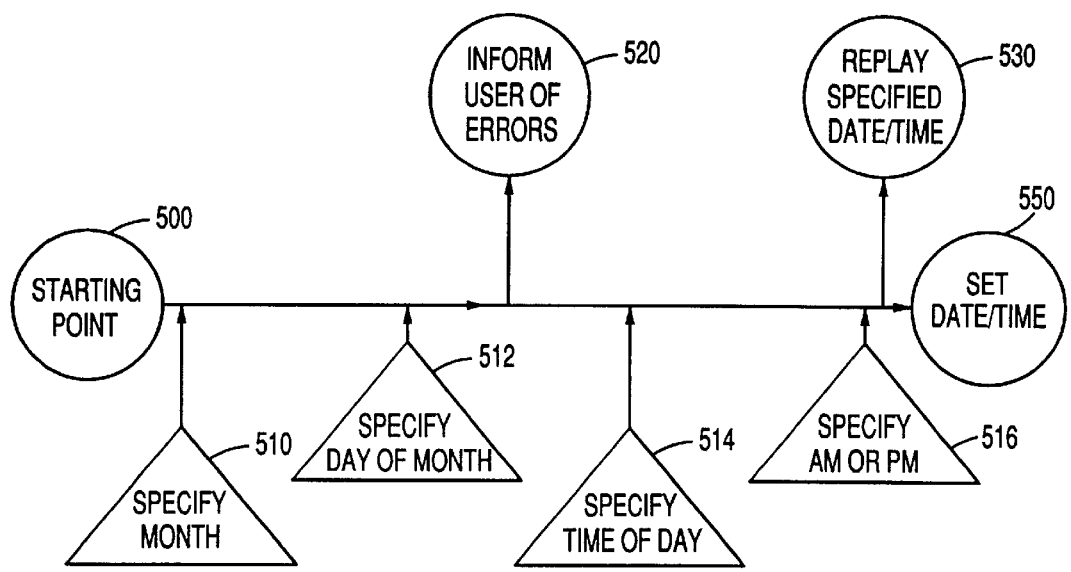
FIG. 4 is an example of a task-oriented diagram for a call forwarding date/time specifier AVR menu.

If the user requests date and time forwarding, the system will then embark on this sub-task. FIG. 4 is an example of a task-oriented diagram for a call forwarding date/time specifier AVR menu. The task of FIG. 4 is a sub-task of FIG. 3. The system has a goal 550 of setting the time and date for the calls to be forwarded. The required inputs 510–516 for the call are the month for forwarding, the day of the month for forwarding, the time of day for forwarding, an A.M./P.M./noon/midnight setting. As in FIG. 3, the menu provides feedback 530 regarding errors. The menu also provides feedback 540 to the user regarding his specified date and forwarding time near the completion of the menu.

The menu and its task completion goals present a simple interface to the user. The user simply provides the requested inputs and the system completes the task. Processing the service call, however, is a more complex process. Specifically, the involved SCN 56 and SCP 50 use call processing logic to achieve the goals of the user. The processing should achieve task-oriented and should provide a menu that complies with the rules above required for "straight-line thinking." This processing is invisible to the user. Thus, the user can quickly and efficiently reach the completion of the task.

Figure 5A:
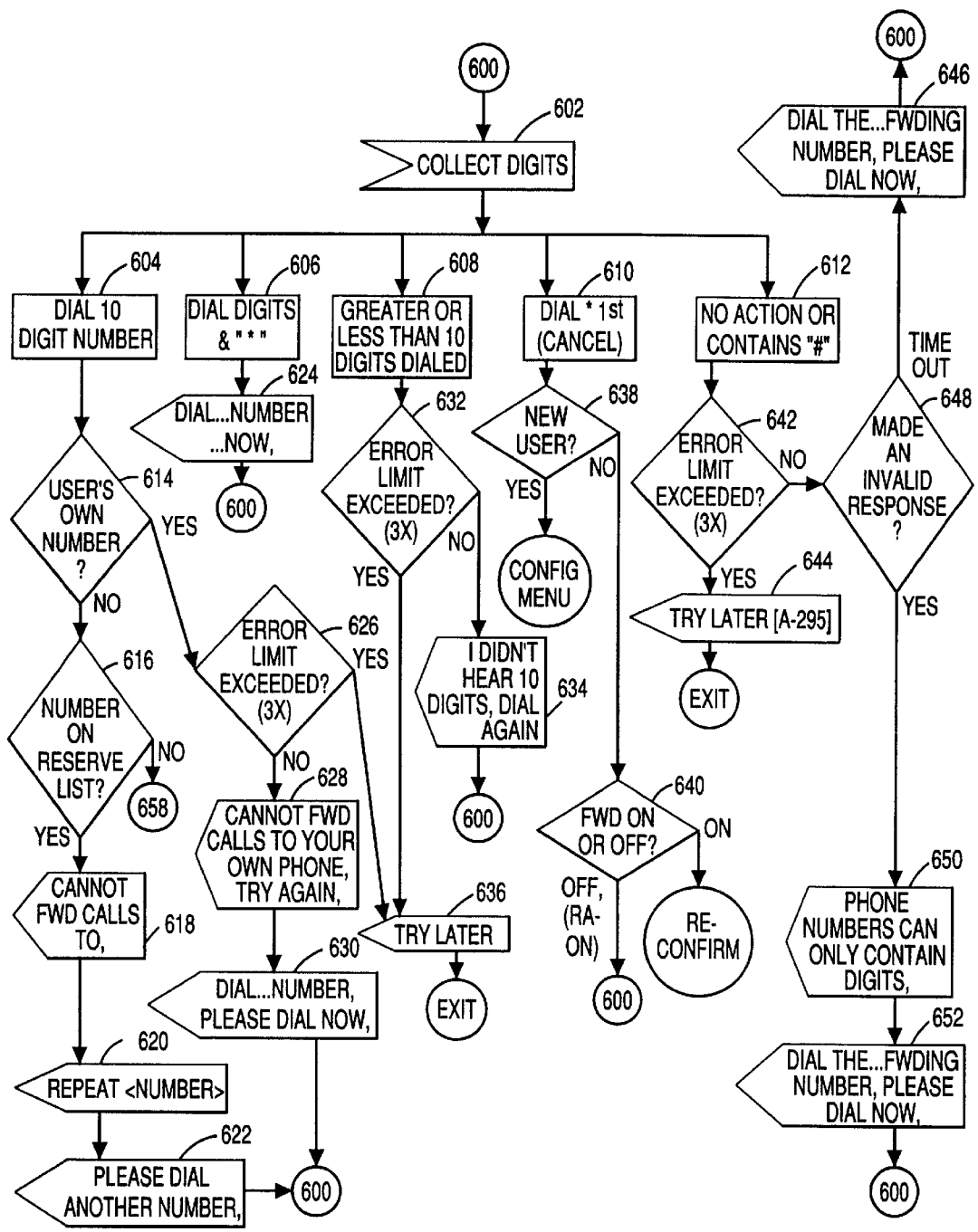
FIGS. 5A and 5B are flow charts of call processing for a call forwarding AVR menu.

FIG. 5A is a flow chart of actual call processing for a call forwarding AVR menu. This flow chart corresponds to the task diagram of FIG. 3. The call processing illustrated in the charts assumes that a user has already requested and received call forwarding privileges from a carrier. The user has also specified a list of numbers to which calls may not be forwarded. These numbers are stored in a reserve list. In addition, the charts assume that the user has initially dialed a special number for call forwarding. In step 600, the caller enters the system which, in turn, requests a 10-digit call forwarding number at step 602. This forwarding number is the first required input for this task. If the caller enters a "*" after the digits in step 606, the system will re-request the forwarding number from the user. If the user dials more than ten digits in step 608, the system will check an internal count of errors. If the number of errors has exceeded a predetermined limit (e.g., three) in step 626, the system will ask the user to try again later in step 636. The call will then disconnect. If the user dials a "*" first, the system will check to determine if the caller is a new user in step 638. If the caller is a new user, the system will go to a separate configuration menu. The configuration menu constitutes a separate task for the user. If the caller is not a new user, the system will cancel the current forwarding request if the forwarding is already off. If the caller has already forwarded calls to a forwarding number, the system will merely re-confirm to the caller that the calls are being forwarded to the forwarding number. If the number contains a "#" or no action is taken, the system will again determine the number of errors already made in step 642. If the number of allowable errors has been exceeded, the system will inform the user to try again later in step 644. If the error limit has not been exceed, the system will determine if the response was invalid due to an excessive number of digits. In step 650, the system will inform the caller that the phone number can only contain ten digits. The system will then re-request the forwarding number in step 652. Similarly, if the system times out in step 648, it will re-request the forwarding number in step 646. The system does not allow the caller to make any additional inputs.

Figure 5B:
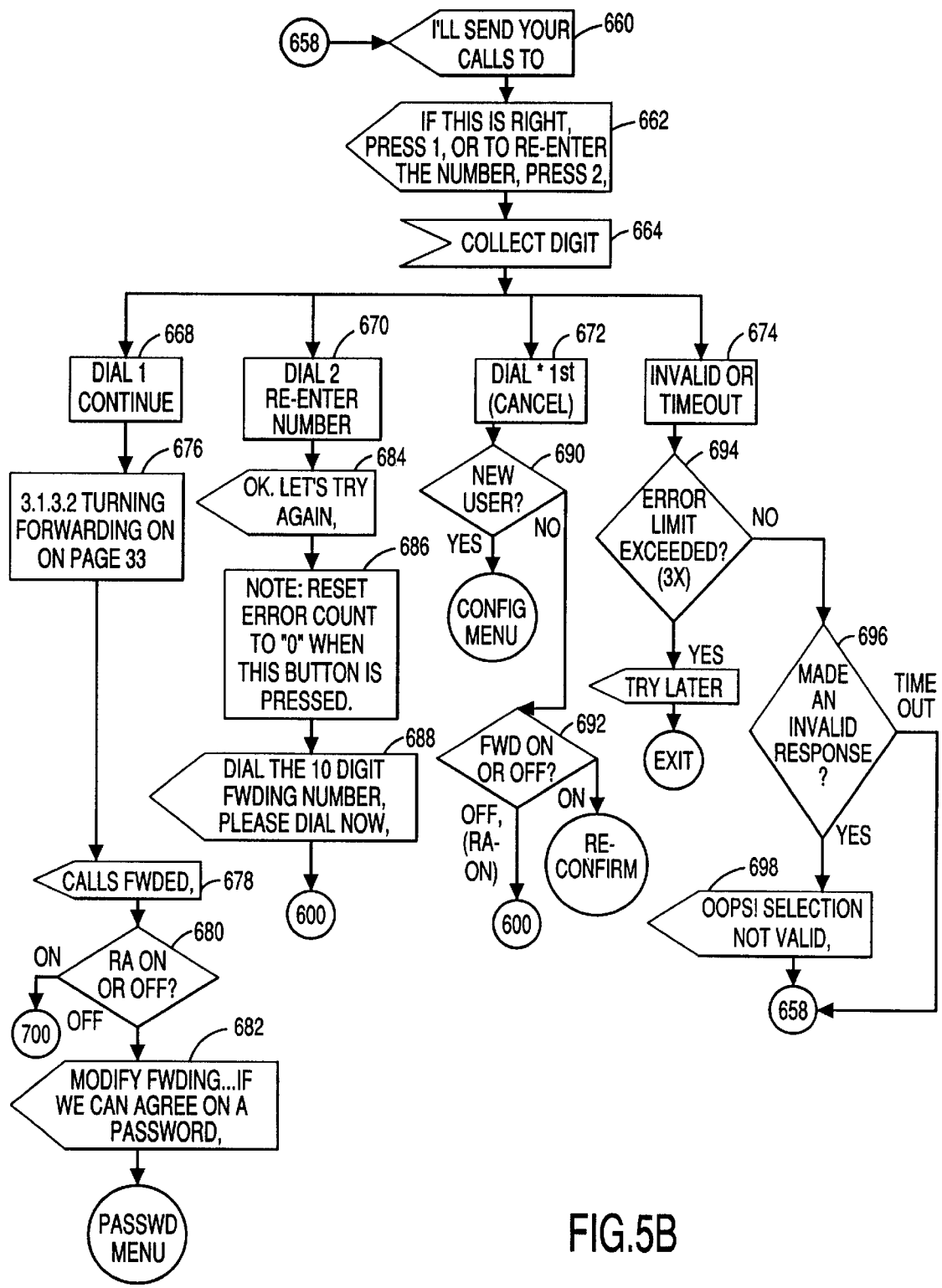

If the user dials a ten-digit number at step 604, the system will check an internal database to determine if the user entered his own telephone number. If the number is the user's own telephone number but the user has not exceeded the number of allowable errors, the system will instruct the user that calls may not be forwarded to his home phone. The system will then ask the user to re-enter the number for forwarding calls. If the number of errors has been exceeded, the system will ask the user to try again later in step 636. The system then determines whether the dialed number is on the user's reserved list. If the number is on the reserve list, the system informs the caller in step 618 that calls may not be forwarded to that number. The system repeats the number in step 620 and asks the user to dial another number in step 622. If the number is not on the reserve list, processing continues at step 660 in FIG. 5B.

In step 660, the system informs the caller that calls have been forwarded to the specified number. Next, the system requests confirmation from the user at step 662. The confirmation is the second of two required inputs for the task of forwarding messages. In step 664, the system collects the digit from the user. If the user dials a "*" to cancel, the system will determine if the caller is a new user. Processing will then proceed as described above with respect to steps 638–640. If the user enters an invalid number or waits too long, the system will ask him to try again later in step 694 when the number of allowable errors has been exceeded. Otherwise, the system will inform the user in step 698 that the selection is not valid. If the user dials "2", the system will ask the user to try forwarding the calls again in step 684. The error count will be reset to "0" in step 686 and the system, in step 688, will request the forwarding number again. Control will then return back to step 600.

If the user dials "1", the caller's subscription is confirmed and the calls are forwarded in step 678. If remote access has been enabled, the caller may go on to specify the date and time for forwarding. If not, the system can embark upon another task to set up remote access call forwarding in step 682.

Figure 6A:
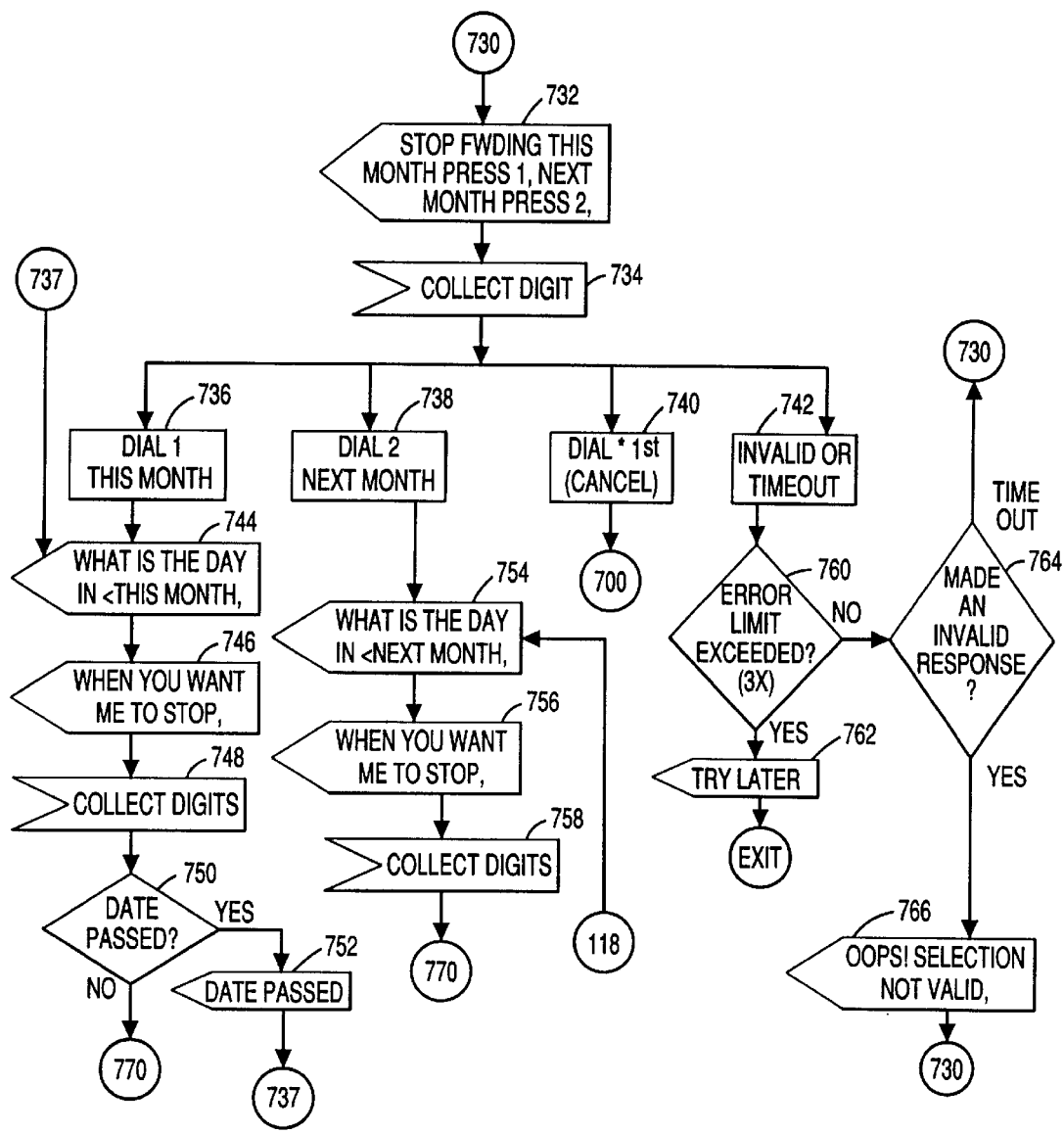
FIGS. 6A–6F are flow charts of call processing for a call forwarding AVR menu with date and time specifications.
Figure 6B:
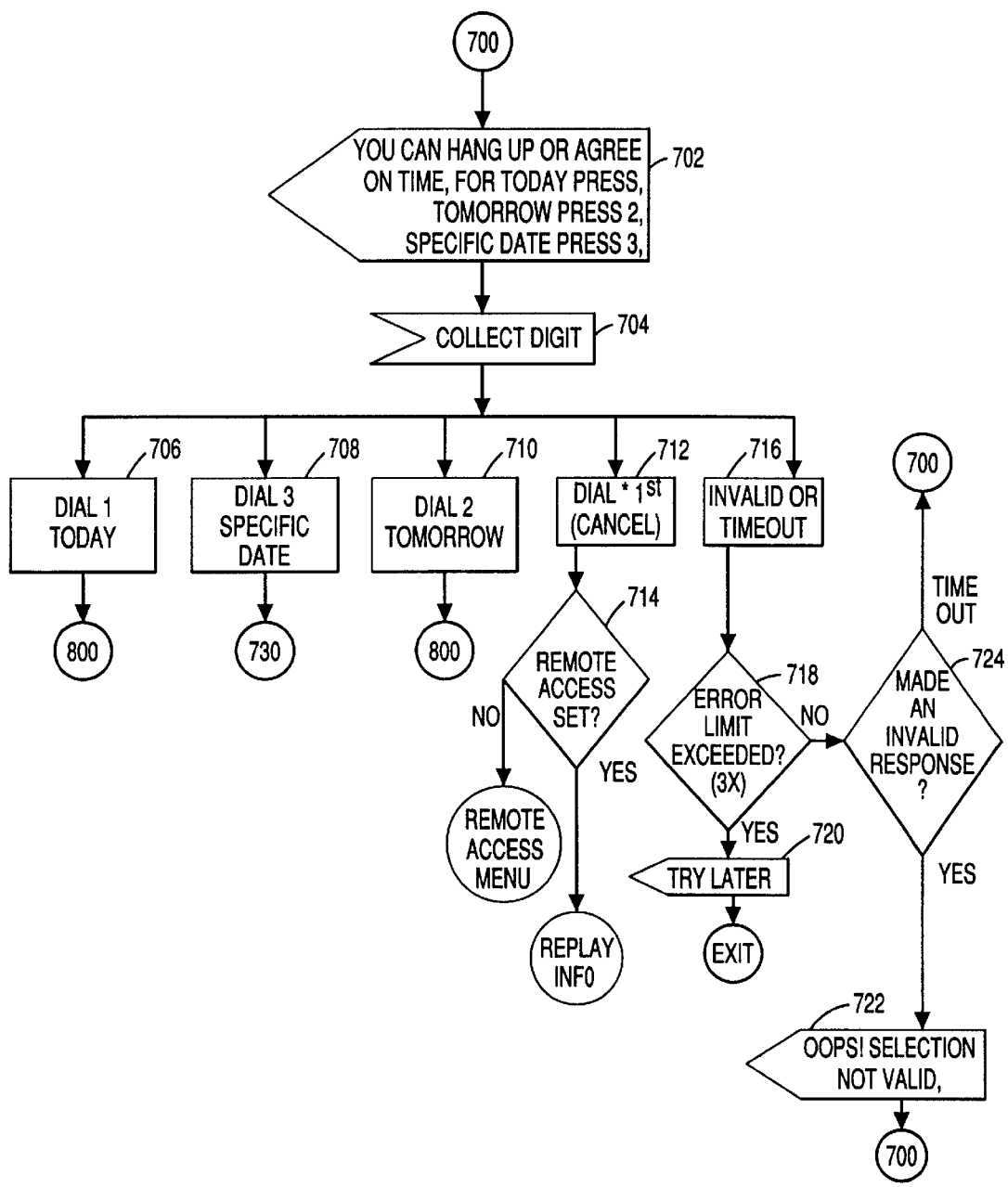
Figure 6C:
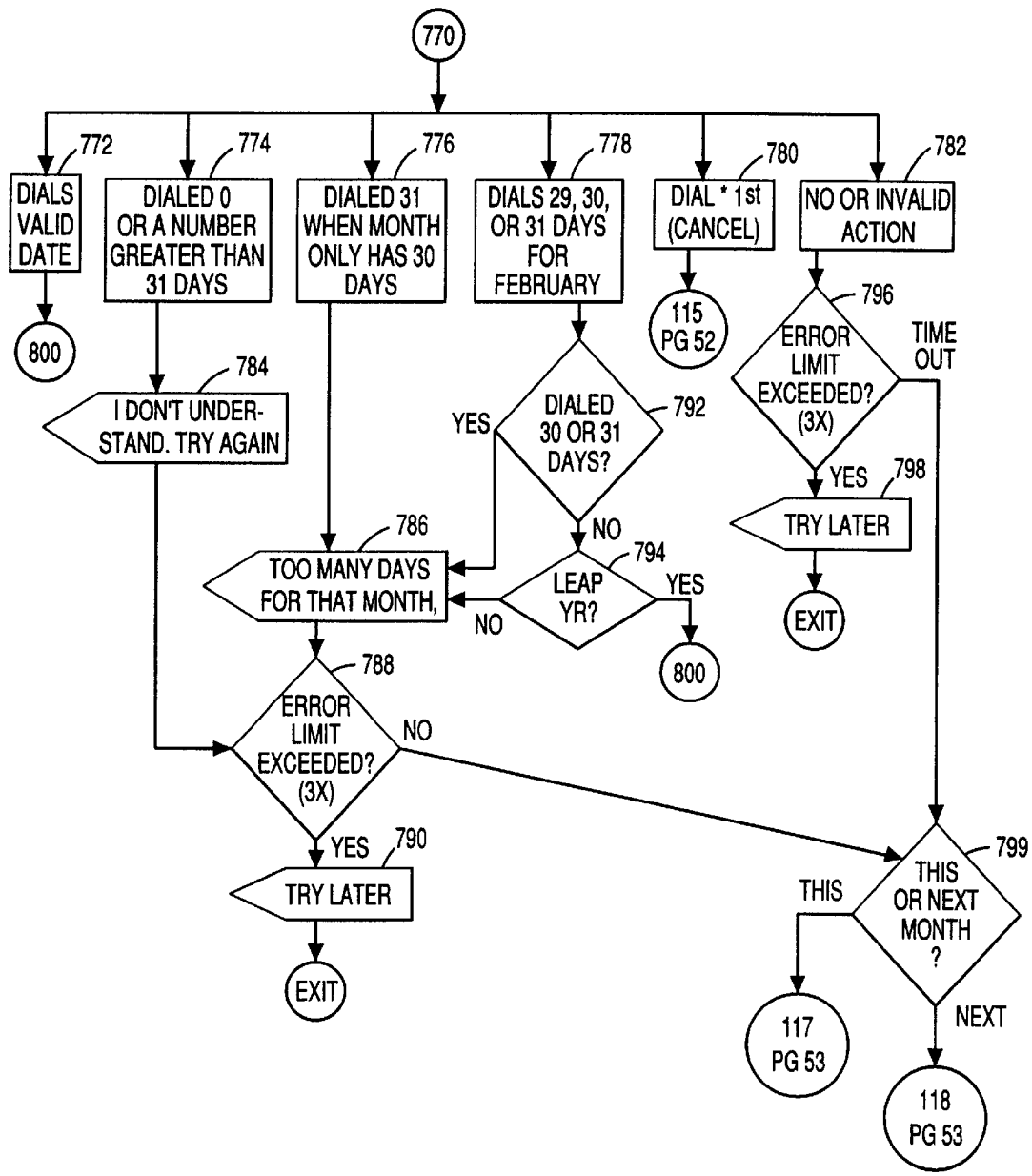
Figure 6D:
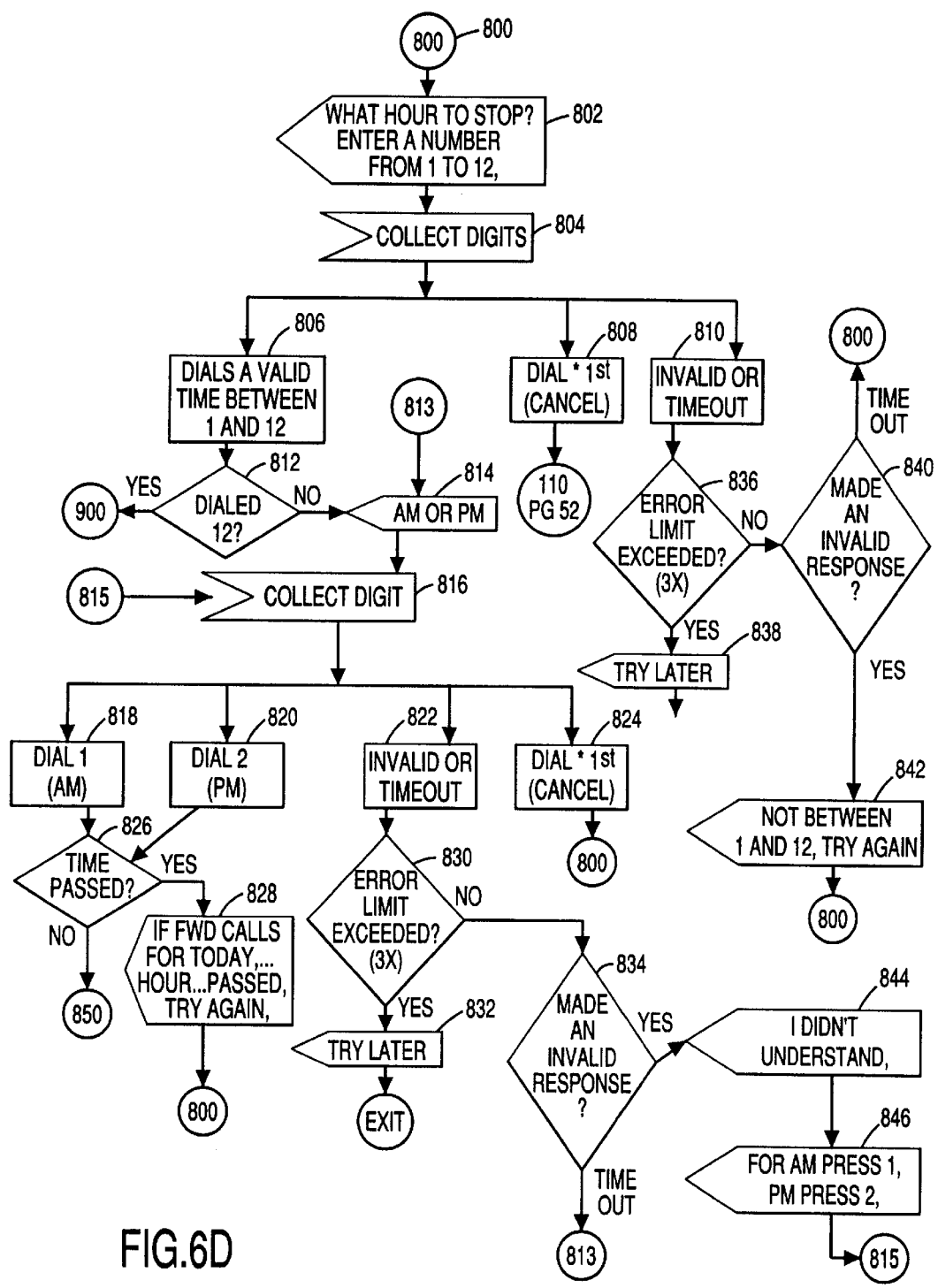
Figure 6E:
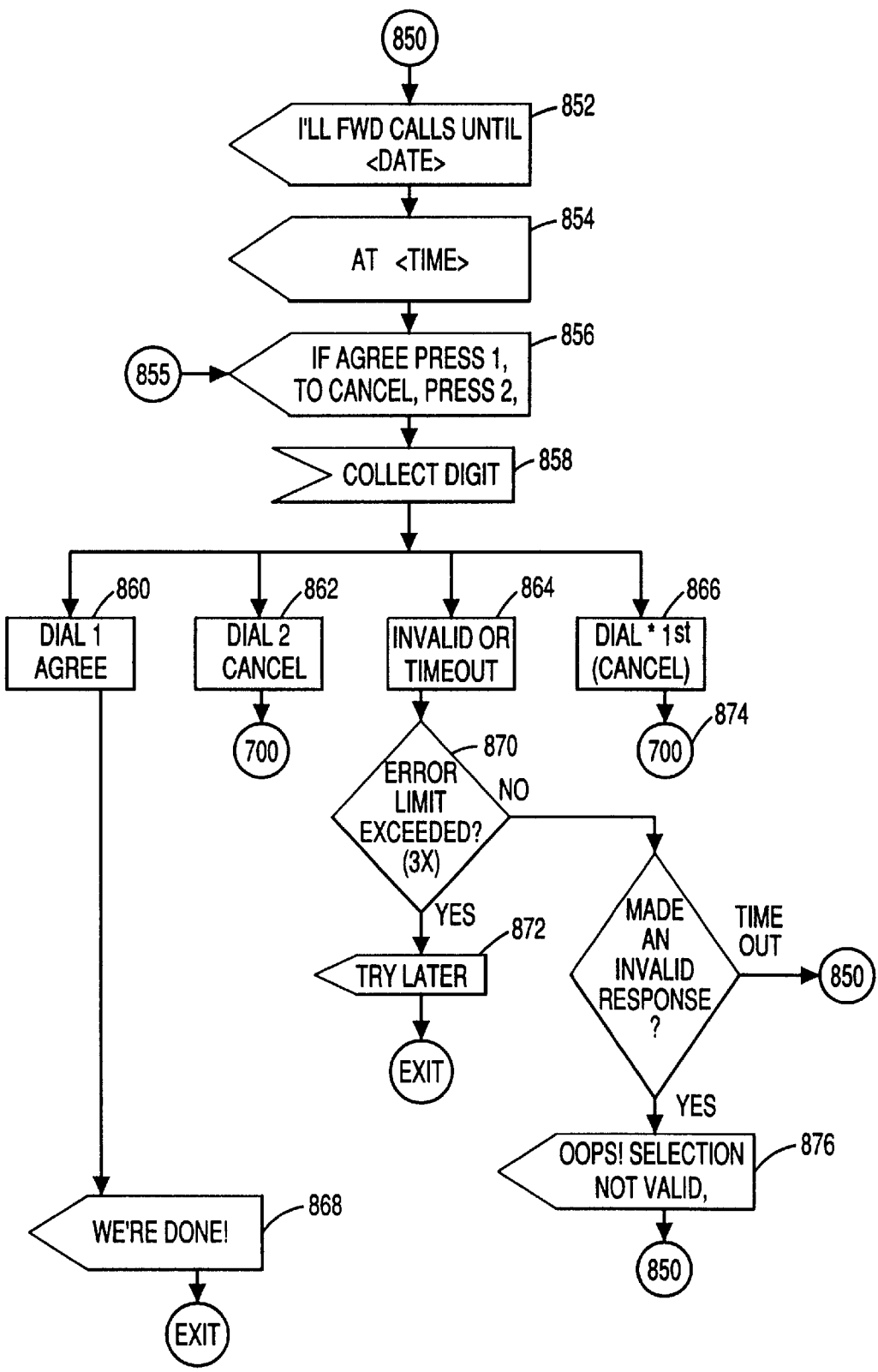
Figure 6F:
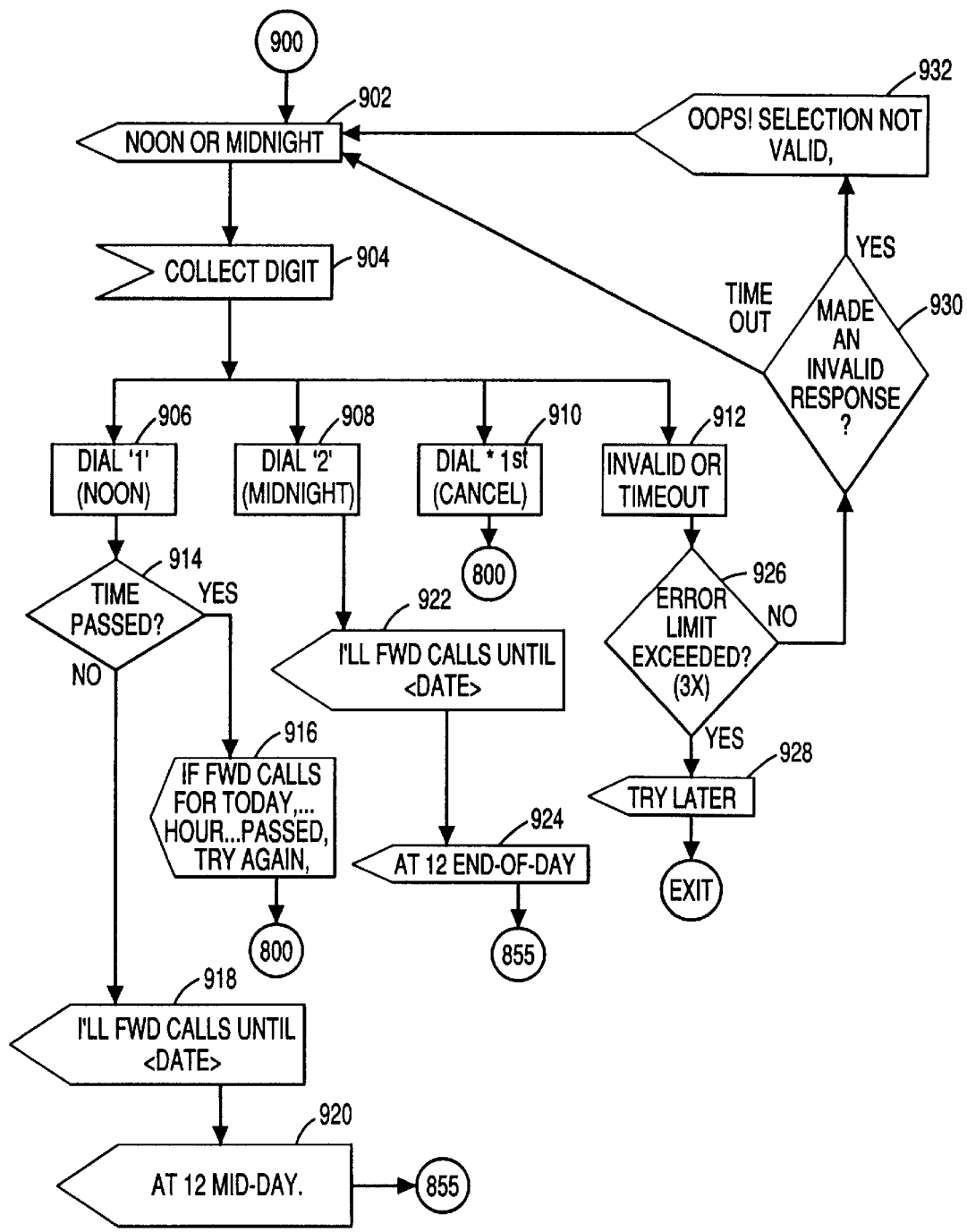

FIG. 6A is an example of a flow chart illustrating the steps performed by the system during a date/time specifying call forwarding call. The task to be completed and the user inputs are illustrated in FIG. 4. At step 702, the system asks the user to hang up or agree upon a time for forwarding. If the user dials a "*" to cancel at step 712, the system determines whether remote access has been set. If remote access has not been set, the user is allowed to set this option in a separate menu as a separate task. If remote access has been set, the system replays the information regarding previous call forwarding. If the system times out or the user enters an invalid response, the system will determine whether the error limit has been exceeded in 718 and instruct the user to try again in step 720. Otherwise, the system will inform the user that an invalid selection has been made in step 722.

When the user specifies today or tomorrow ("1" or "2"), the system automatically goes to step 800 to determine the proper time for forwarding. When the user dials "3" for a specific date, the system continues on to step 730. At step 732, the system asks the user if he would like to stop forwarding his calls this month or next month. If the user dials a "*" the system returns back to step 700. For timeouts and invalid responses, the system behaves as described above with respect to the previous menus. If the user requests next month at step 738, the system requests the day of the month in step 754. This information is stored at the SCP. The system then asks the user when forwarding should be stopped at step 756. In step 758, the system collects the required input and proceeds to step 770. When the user specifies the current month in step 736, the system requests the day of the month in step 744. At step 746, the system asks the user when forwarding should be terminated at step 746. At step 748, the system collects the required input for the day of the month and stores them in the SCP. If the date has passed, the system informs the user at step 752 and returns to step 744. Processing continues at step 770.

At step 770, the system determines whether the user has entered a proper date. If the user dials "*" to cancel, the system returns the user back to step 730. If no action is taken or an invalid action is taken, the system determines whether the allowable number of errors has been exceeded. If the number of errors has been exceeded, the system instructs the user to try again later at step 798. Where the user dials a number greater than 28 for February, the system first checks to determine whether the current year is a leap year. If the year is a leap year, control continues at step 800. Otherwise, the system informs the user that he has entered too many days for the specified month at step 786. The error limit is checked in step 788 and the system re-inquires about the month in step 799. Where the user dials "0" or a number greater than "31", the system informs the user that this command is not understood. Control then continues at step 788. For valid dates, the system continues processing the call at step 800.

At step 802, the system asks the user to provide the time of day. At step 804, the system collects another user input. If the user cancels the call by dialing "*", the system returns to step 700. For invalid responses or timeouts, the system responds as described above with respect to the previous menus. Where the user enters a valid time between 1 and 12, the system determines whether the user has entered "12". If the user has entered 12, the system goes to step 900 to determine whether midnight or noon is the correct time. If the user fails to enter a number between 1 and 12, the system returns to step 800. For other times of day, the system requests an A.M. or P.M. designation at step 816. The system then determines in step 826, whether the specified time has passed. If the time has passed, the system informs the caller that the time has passed and asks the user to try again. Flow control returns to step 800. If the time is valid and has not passed, flow control continues at step 850. For invalid responses to the A.M. or P.M. inquiry, the system in steps 830–834 responds as described above for previous menus.

In step 852, the system instructs the caller that calls will be forwarded until the specified date. At step 854, the selected time of day is stated. The user is allowed to confirm this information at step 856. These digits are collected at step 858. If the user enters an invalid number or the system times out, steps 870–872 are similar to the steps above for invalid responses and timeouts. If the user cancels by dialing "*" or "2", the system returns the user to step 700. Otherwise, the system stores the information and informs the user that the call has completed at step 868.

Where the user specifies "12" as the stopping time for forwarding, the system goes to step 900. At step 902, the system asks the user if the requested time is "noon" or "midnight". At step 904, the system collects digits from the user. If the user enters an invalid response, the system first determines whether the number of allowable errors has been exceeded. If this number has been exceed, the system asks the user to try again at a later time in step 928. If the number of allowable errors has not been exceeded, the system informs the user at step 932 that the selection is not valid. For timeouts, the system returns to step 902. If the user cancels by dialing "*", the system returns to step 800, which remains within the current task. If the user specifies midnight, the system, at step 922, informs the caller that he will forward calls until a specific date. At step 924, the system informs the caller that at the end of the day, the system will stop forwarding calls. For noon, the system first determines whether this time has passed at step 914. If the time has passed, the system instructs the user that the time has passed at step 916 and returns to step 800. If the time is valid, the system informs the user that calls will be forwarded until the specified day and further informs the caller that forwarding will cease at noon. For valid times, flow control returns to step 856 for confirmation another required input, from the user.

Having thus described a preferred embodiment of a method and system for navigating a subscriber through a telecommunications services menu, it should be apparent to those skilled in the art that certain advantages have been achieved. It should also be appreciated that various modifications, adaptations, and alternative embodiments thereof, including its use in AVR billing menus, for example, may be made within the scope and spirit of the present invention. The invention is further defined by the following claims:

What is claimed is:

1. In an Advanced Intelligent Network (AIN) of a telecommunications system including a telephone line being provided with an advanced service, a method for efficiently interfacing with a user so as to carry out a task selected by the user with respect to the advanced service, the method comprising:

receiving a call with the call being directed to a feature access code (FAC) or to a special access number (SAN) and with the FAC or the SAN corresponding to the task with respect to the advanced service being provided to the telephone line;

receiving from the call an input of information;

in response to the input of information, providing feedback to the call
with the feedback relating to the task if the input of information relates to the task, or
with the feedback including an error message if the input of information fails to relate to the task; and if the input of information relates to the task, then causing the task to be carried out based on the input of information and to be carried out by the AIN with respect to the advanced service being provided to the telephone line, whereby the user is limited to the task corresponding to the FAC or the SAN and unable to switch to any other task.

2. The method of claim 1, wherein the task comprises a sub-task, the method comprising:

prior to causing the task to be carried out, causing the feedback relating to the task to include instructions to the call on election of implementation of the sub-task; and causing the task to be carried out if the call fails to respond with the election of implementation of the sub-task.

3. The method of claim 1, wherein the task comprises a sub-task, the method comprising:

prior to causing the task to be carried out,
causing the feedback relating to the task to include instructions to the call on election of implementation of the sub-task,
receiving the election of implementation of the sub-task, and
receiving optional input relating to the sub-task; and
then causing the task to be carried out by implementation of the sub-task based on the optional input.

4. The method of claim 1, wherein the feedback comprises the first feedback, wherein the input of information comprises a first input of information, and further comprising:

in response to the first feedback including the error message, receiving a second input of information;

in response to the second input of information, providing a second feedback to the call
with the second feedback relating to the task if the second input of information relates to the task, or
with the second feedback including an error message if the second input of information fails to relate to the task; and if the second input of information relates to the task, then causing the task to be carried out based on the second input of information and to be carried out by the AIN with respect to the advanced service being provided to the telephone line.

5. The method of claim 1, wherein the advanced service comprises a call forwarding service;

wherein the task comprises activating the call forwarding service with respect to the telephone line;

wherein the input of information comprises a number to which calls to the telephone line are to be forwarded;

wherein the feedback relating to the task comprises a replay of the number; and wherein causing the task to be carried out comprises causing the calls to the telephone line to be forwarded to the number.

6. In an Advanced Intelligent Network (AIN) of a telecommunications system, a method for efficiently interfacing with a user to activate a call forwarding service with respect to a telephone number, the method comprising:

receiving a call with the call being directed to a feature access code (FAC) or to a special access number (SAN) and with the FAC or the SAN designated for calls to the telephone number related to activating the call forward service;

receiving from the call a number to which calls to the telephone number are to be forwarded;

in response to receipt of the number, providing feedback to the call
with the feedback comprising a replay of the number if the number comprises an authorized number, and
with the feedback comprising an error message if the number comprises an unauthorized number; and if the feedback comprises the replay of the number, then causing the calls to the telephone number to be forwarded to the number, whereby the user is limited to a task corresponding to the FAC or the SAN and unable to switch to any other task.

7. The method of claim 6, wherein the call forwarding service may be activated for a specific date and time, the method comprising:

prior to causing the calls to the telephone number to be forwarded to the number, causing the feedback comprising the replay of the number to include instructions to the call on election of implementation of the call forwarding service to the specific date and time; and causing the calls to the telephone number to be forwarded to the number if the call fails to respond with election of implementation of the call forwarding service for the specific date and time; and causing the calls to the telephone number to be forwarded to the number if the call fails to respond with election of implementation of the call forwarding service for the specific date and time.

8. The method of claim 6, wherein the call forwarding service may be activated for a specific date and time, the method comprising:

prior to causing the calls to the telephone number to be forwarded to the number,
causing the feedback comprising the replay of the number to include instructions to the call on election of implementation of the call forwarding service for the specific date and time,
receiving the election of implementation the call forwarding service for the specific date and time, and
receiving the specific date/time; and
then causing the calls to the telephone number to be forwarded to the number for the specific date and time.

9. The method of claim 6, wherein the feedback comprises the first feedback, wherein the number comprises a first number, and further comprising:

in response to the first feedback including the error message, receiving a second number;

in response to the second number, providing a second feedback to the call
with the second feedback comprising a replay of the second number if the second number comprises an authorized number, and
with the second feedback comprising an error message if the second number comprises an unauthorized number; and
if the second feedback comprises the replay of the second number, then causing the calls to the telephone number to be forwarded to the second number.

10. In an Advanced Intelligent Network (AIN) of a telecommunications system including a telephone line being provided with an advanced service, a method for efficiently interfacing with a user so as to carry out a task selected by the user with respect to the advanced service, the method comprising:
receiving a call with the call being directed to a feature access code (FAC) or to a special access number (SAN) and with the FAC or the SAN corresponding to the task with respect to the advanced service being provided to the telephone line;
based on the call being directed to the FAC or the SAN, connecting the call to an automated voice response (AVR) system;
causing the AVR system
to receive an input of information received from the call, and
in response to the input of information, to respond with feedback to the call with the feedback relating to the task if the input of information relates to the task, or with the feedback including an error message if the input of information fails to relate to the task; and
if the input of information relates to the task, then causing the task to be carried out based on the input of information and to be carried out by the AIN with respect to the advanced service being provided to the telephone line,
whereby the user is limited to the task corresponding to the FAC or the SAN and unable to switch to any other task.

11. The method of claim 10, wherein the task comprises a sub-task, the method comprising:
prior to causing the task to be carried out, causing the AVR system to include instructions on election of implementation of the sub-task in the feedback relating to the task; and
causing the task to be carried out if the call fails to respond with the election of implementation of the sub-task.

12. The method of claim 10, wherein the task comprises a sub-task, the method comprising:
prior to causing the task to be carried out,
causing the AVR system to include instructions to the call on election of implementation of the sub-task in the feedback relating to the task,
receiving the election of implementation of the sub-task and optional input relating to the sub-task, and
providing the election of implementation of the sub-task and the optional input to the AVR system;
then causing the task to be carried out by implementation of the sub-task based on the optional input.

13. The method of claim 10, wherein the feedback comprises the first feedback, wherein the input of information comprises a first input of information, and further comprising:
in response to the first feedback including the error message, receiving a second input of information and providing the second input of information to the AVR system;
in response to the second input of information, causing the AVR system to provide a second feedback to the call with the second feedback relating to the task if the second input of information relates to the task, or with the second feedback including an error message if the second input of information fails to relate to the task; and
if the second input of information relates to the task, then causing the task to be carried out based on the second input of information and to be carried out by the AIN with respect to the advanced service being provided to the telephone line.

14. The method of claim 10, wherein the advanced service comprises a call forwarding service;
wherein the task comprises activating the call forwarding service with respect to the telephone line;
wherein the input of information comprises a number to which calls to the telephone line are to be forwarded;
wherein the feedback relating to the task comprises a replay of the number; and
wherein causing the task to be carried out comprises causing the calls to the telephone line to be forwarded to the number.

* * * * *